United States Patent Office 3,250,821
Patented May 10, 1966

3,250,821
ISOMERIZATION OF 3-METHYL-1,3-PENTADIENE
Herbert L. Bullard, Cuyahoga Falls, Ohio, assignor to The Goodyear Tire & Rubber Company, Akron, Ohio, a corporation of Ohio
No Drawing. Filed Aug. 12, 1964, Ser. No. 389,202
6 Claims. (Cl. 260—680)

This application is a continuation-in-part of application Serial No. 195,971, filed May 18, 1962 and now abandoned.

This invention relates to the isomerization of an olefin feed composed essentially of 3-methyl-1,3-pentadiene by action of a hydrogen halide, with the production of 2-ethyl butadiene.

The nature of the isomerization is understood if

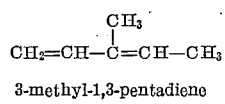

3-methyl-1,3-pentadiene is written as

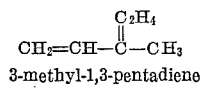

3-methyl-1,3-pentadiene and the isomerized product is written in the usual way:

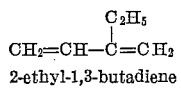

2-ethyl-1,3-butadiene

The resulting 2-ethyl-1,3-butadiene can be polymerized to rubbery 2-ethyl-1,3-butadiene polymer.

Although the process is designed more particularly for the treatment of feed mixtures of hydrocarbons containing about 70 to 90 percent of 3-methyl-1,3-pentadiene, it may be used in the treatment of mixtures containing at least 40 percent of this isomer, and to a feed composed entirely of this isomer.

Although HBr is the preferred catalyst, HCl or HI or even HF can be used. The catalyst can be added to the reaction product as a halogen hydride, or as a hydrogen-halide-forming material such as ethyl bromide, propyl bromide, carbon tetrachloride, carbon tetrabromide, benzyl chloride, benzyl bromide, chlorine, bromine, iodine, fluorine, etc., each of which yields hydrogen halide upon decomposition. The catalyst may be added to the reaction by itself as a liquid or a gas, or it may be dissolved in water or other liquid used as diluent in the reaction.

A usual amount of catalyst is employed such as 1 percent or more up to any desired amount such as 25 or 50 percent, but usually 3 through 10 percent based on the weight of the 3-methyl-1,3-pentadiene will be used. The reaction can be carried on as a batch or a continuous process, with recovery of the products and subsequent separation of the 2-ethyl-1,3-butadiene from the unisomerized 3-methyl-1,3-pentadiene. The unisomerized 3-methyl-1,3-pentadiene is usually then recycled with conversion of, for example, 25 or 30 percent of the 3-methyl-1,3-pentadiene to 2-ethyl-1,3-butadiene in each cycle.

The temperature in the reaction vessel is usually maintained in the range of 400° to 700° C. Pressures may vary from as low as 10 mm. of Hg to as high as 300 pounds per square inch (gauge), but preferably will be between atmospheric and 25 pounds per square inch (gauge). The reaction effluent is preferably rapidly cooled to limit decomposition.

The times employed to effect the reaction are short, and may vary in the range of .001 through 2 seconds, or preferably .05 through .5 second. These times are computed by using the mols of both reactant and diluent, if any be employed, i.e., total mols of gas passing through the reactor of given volume. A long exposure to the isomerization conditions usually causes cracking of the 3-methyl-1,3-pentadiene and/or 2-ethyl-1,3-butadiene.

Selectivity is improved by the use of diluent such as carbon dioxide, methane, nitrogen, ethane, propane, benzene, toluene or other inert gas or vapor. A preferred diluent is steam. Steam can be advantageously used along with other diluents. When a diluent is employed, it is usually employed in mol ratios of diluent to 3-methyl-1,3-butadienes varying from 1/1 to about 15/1. The amount is not critical.

The following example is illustrative:

A mixture of hydrocarbons containing about 85 percent 3-methyl-1,3-pentadiene and 7 percent benzene (serving as diluent) was pumped into a reactor at 650° C. and at atmospheric pressure. Just prior to entry into the reactor zone this mixture of hydrocarbons was diluted with steam in a 2.9/1 mol ratio of water to hydrocarbon; the water contained 7.8 mol percent HBr based on the 3-methyl-1,3-pentadiene. Thus, the diluent was largely steam. The residence time in the reactor was 0.2 second based on the total feed. The effluent was quickly cooled. The product collected was analyzed using conventional procedures and represented a yield of 15.5 percent to 2-ethyl-1,3-butadiene at an efficiency of 26.4 percent (i.e., weight of 2-ethyl-1,3-butadiene/weight of reacted 3-methyl-1,3-pentadiene).

The example is illustrative.

The invention is covered in the claims which follow. What I claim is:

1. The process of isomerizing 3-methyl-1,3-pentadiene to 2-ethyl-1,3-butadiene which comprises heating an olefin feed containing at least forty percent of 3-methyl-1,3-pentadiene for .001 to 2 seconds at 400 to 700° C. at 10 mm. to 300 pounds per square inch (gauge) in the presence of a hydrogen halide.

2. The process of claim 1 in which the time of reaction is .05 to .5 second.

3. The process of claim 1 carried out in the presence of 2 to 12 mols of inert diluent to 1 mol of 3-methyl-1,3-pentadiene.

4. The process of claim 1 carried out in the presence of 2 to 12 mols of diluent to 1 mol of 3-methyl-1,3-pentadiene which diluent is at least largely steam.

5. The process of claim 1 in which 3 to 10 mol percent of catalyst is used based on the mols of 3-methyl-1,3-pentadiene.

6. The process of claim 1 in which 3 to 10 mol percent of catalyst is used based on the mols of 3-methyl-1,3-pentadiene, 2 to 12 mols of diluent is used at a temperature of 500 to 700° C. at a pressure between atmospheric and 25 pounds per square inch (gauge) and the residence time is .05 to .5 second.

References Cited by the Examiner
UNITED STATES PATENTS 2,277,650  3/1942  Mueller-Cunradi et al. _____ 260—683.2
2,403,439  7/1946  Ipatieff et al. _____ 260—683.2
2,450,039  9/1948  Frey _____ 260—683.2

FOREIGN PATENTS 588,870  7/1960  Belgium.

OTHER REFERENCES

Marvel et al., J. Amer. Chem. Soc., 70 (1948), pp. 3842–3846.

PAUL M. COUGHLAN, Primary Examiner.